United States Patent
Jundt et al.

(10) Patent No.: US 6,618,630 B1
(45) Date of Patent: Sep. 9, 2003

(54) USER INTERFACE THAT INTEGRATES A PROCESS CONTROL CONFIGURATION SYSTEM AND A FIELD DEVICE MANAGEMENT SYSTEM

(75) Inventors: Larry O. Jundt, Round Rock, TX (US); Mark J. Nixon, Round Rock, TX (US); Jon D. Westbrock, Eagen, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/342,573

(22) Filed: Jul. 8, 1999

(51) Int. Cl.[7] .............................................. G05B 11/01
(52) U.S. Cl. ............................ 700/17; 700/19; 709/220
(58) Field of Search .............................. 700/17, 19, 83, 700/87, 180; 709/220, 223

(56) References Cited

U.S. PATENT DOCUMENTS

| | | | |
|---|---|---|---|
| 3,665,172 A | 5/1972 | Spaargaren | 235/150.1 |
| 4,006,464 A | 2/1977 | Landell | 340/172.5 |
| 4,047,003 A | 9/1977 | LaRocca et al. | 235/151.11 |

(List continued on next page.)

FOREIGN PATENT DOCUMENTS

| | | |
|---|---|---|
| DE | 42 10 376 A1 | 10/1992 |
| EP | 0 434 288 A2 | 6/1991 |
| EP | 0 434 986 A2 | 7/1991 |
| EP | 0 560 226 A2 | 9/1993 |
| FR | 2 692 701 | 12/1993 |
| FR | 2 713 360 | 6/1995 |
| WO | WO 95/04314 | 2/1995 |
| WO | WO 95/09387 | 4/1995 |
| WO | WO 95/26527 | 10/1995 |
| WO | WO 96/07957 A1 | 3/1996 |

OTHER PUBLICATIONS

Arnold et al., "Object–Oriented Design Environments in Process Control," 8131 Advance in Instrumentation and Control 44 (1989), Part 3.

(List continued on next page.)

Primary Examiner—Albert W. Paladini
Assistant Examiner—Zoila Cabrera
(74) Attorney, Agent, or Firm—Marshall, Gerstein & Borun (57) ABSTRACT

A user interface is adapted to be used in a process control network having a controller communicatively coupled to a plurality of field devices, a process control configuration database and a workstation having a display, a processor and a memory communicatively coupled to the controller. The user interface includes a process control configuration system that enables a user to manipulate and view a process control solution for use in the process control network, a field device management system that enables a user to communicate with one of the field devices and an interface that passes data between the process control configuration system and the field device management system to enable simultaneous use of the process control configuration system and the field device management system.

20 Claims, 3 Drawing Sheets

U.S. PATENT DOCUMENTS

| | | | |
|---|---|---|---|
| 4,096,566 A | 6/1978 | Borie et al. | 710/110 |
| 4,195,344 A | 3/1980 | Yamazaki | 710/316 |
| 4,368,510 A | 1/1983 | Anderson | 700/31 |
| 4,413,314 A | 11/1983 | Slater et al. | 700/83 |
| 4,443,861 A | 4/1984 | Slater | 710/8 |
| 4,517,637 A | 5/1985 | Cassell | 700/9 |
| 4,571,676 A | 2/1986 | Mantellina et al. | 711/172 |
| 4,586,151 A | 4/1986 | Buote | 700/249 |
| 4,589,063 A | 5/1986 | Shah et al. | 710/8 |
| 4,602,343 A | 7/1986 | Dougherty | 364/505 |
| 4,628,437 A | 12/1986 | Poschmann et al. | 700/2 |
| 4,639,852 A | 1/1987 | Motomiya | 700/9 |
| 4,641,269 A | 2/1987 | Japenga et al. | 700/158 |
| 4,648,064 A | 3/1987 | Morley | 710/45 |
| 4,663,704 A | 5/1987 | Jones et al. | 700/83 |
| 4,672,529 A | 6/1987 | Kupersmit | 700/1 |
| 4,680,753 A | 7/1987 | Fulton et al. | 370/85 |
| 4,682,158 A | 7/1987 | Ito et al. | 340/679 |
| 4,704,676 A | 11/1987 | Flanagen et al. | 700/17 |
| 4,774,656 A | 9/1988 | Quatse et al. | 714/4 |
| 4,777,584 A | 10/1988 | Pogue | 700/17 |
| 4,825,404 A | 4/1989 | Theus | 710/104 |
| 4,864,489 A | 9/1989 | Yasuhara et al. | 700/2 |
| RE33,162 E | 2/1990 | Yoshida et al. | 364/492 |
| 4,910,658 A | 3/1990 | Dudash et al. | 700/9 |
| 4,910,691 A | 3/1990 | Skeirik | 706/45 |
| 4,965,742 A | 10/1990 | Skeirik | 700/86 |
| 4,965,880 A | 10/1990 | Petitjean | 700/112 |
| 5,068,778 A | 11/1991 | Kosem et al. | 700/9 |
| 5,095,417 A | 3/1992 | Hagiwara et al. | 700/9 |
| 5,115,511 A | 5/1992 | Nilsson et al. | 395/800 |
| 5,121,318 A | 6/1992 | Lipner et al. | 364/146 |
| 5,122,948 A | 6/1992 | Zapolin | 340/3.53 |
| 5,124,908 A | 6/1992 | Broadbent | 700/83 |
| 5,140,677 A | 8/1992 | Fleming et al. | 395/159 |
| 5,146,401 A | 9/1992 | Bansal et al. | 700/9 |
| 5,164,894 A | 11/1992 | Cunningham-Reid et al. | 700/2 |
| 5,168,441 A | 12/1992 | Onarheim et al. | 700/17 |
| 5,202,961 A | 4/1993 | Mills et al. | 395/159 |
| 5,208,744 A | 5/1993 | Kanda | 700/42 |
| 5,233,510 A | 8/1993 | Brueckner et al. | 700/2 |
| 5,247,450 A | 9/1993 | Clark | 700/158 |
| 5,251,125 A | 10/1993 | Karnowski et al. | 700/84 |
| 5,265,005 A | 11/1993 | Schmidt et al. | 700/18 |
| 5,282,128 A | 1/1994 | Braude | 700/28 |
| 5,289,365 A | 2/1994 | Caldwell et al. | 700/9 |
| 5,307,491 A | 4/1994 | Feriozi et al. | 395/700 |
| 5,309,556 A | 5/1994 | Sismilich | 395/161 |
| 5,311,451 A | 5/1994 | Barrett | 700/278 |
| 5,317,723 A | 5/1994 | Heap et al. | 395/500 |
| 5,319,751 A | 6/1994 | Garney | 395/200 |
| 5,323,328 A | 6/1994 | Tanaka | 700/287 |
| 5,365,423 A | 11/1994 | Chand | 700/12 |
| 5,371,895 A | 12/1994 | Bristol | 395/800 |
| 5,377,315 A | 12/1994 | Leggett | 395/140 |
| 5,384,910 A | 1/1995 | Torres | 395/156 |
| 5,386,360 A | 1/1995 | Wilson et al. | 700/17 |
| 5,392,389 A | 2/1995 | Fleming | 395/159 |
| 5,394,522 A | 2/1995 | Sanchez-Frank et al. | 395/159 |
| 5,406,176 A | 4/1995 | Sugden | 315/292 |
| 5,408,603 A | 4/1995 | Van de Lavoir et al. | 395/161 |
| 5,412,643 A | 5/1995 | Kogure | 370/24 |
| 5,420,977 A | 5/1995 | Sztipanovits et al. | 395/160 |
| 5,426,732 A | 6/1995 | Boies et al. | 395/161 |
| 5,428,734 A | 6/1995 | Haynes et al. | 395/159 |
| 5,437,007 A | 7/1995 | Bailey et al. | 395/159 |
| 5,444,642 A | 8/1995 | Montgomery et al. | 702/91 |
| 5,452,201 A | 9/1995 | Pieronek et al. | 700/83 |
| 5,459,825 A | 10/1995 | Anderson et al. | 395/133 |
| 5,459,867 A | 10/1995 | Adams et al. | 395/700 |
| 5,461,710 A | 10/1995 | Bloomfield et al. | 395/161 |
| 5,465,364 A | 11/1995 | Lathrop et al. | 395/700 |
| 5,469,352 A | 11/1995 | Yukutomo et al. | 700/87 |
| 5,485,400 A | 1/1996 | Warrior et al. | 700/67 |
| 5,486,998 A | 1/1996 | Corso | 700/32 |
| 5,497,316 A | 3/1996 | Sierk et al. | 700/11 |
| 5,500,934 A | 3/1996 | Austin et al. | 395/755 |
| 5,586,324 A | 12/1996 | Sato et al. | 395/652 |
| 5,613,123 A | 3/1997 | Tsang et al. | 395/651 |
| 5,838,563 A * | 11/1998 | Dove et al. | 700/83 |
| 5,903,455 A * | 5/1999 | Sharpe, Jr. et al. | 700/83 |
| 6,067,477 A * | 5/2000 | Wewalaarachchi et al. | 700/83 |
| 6,076,952 A * | 6/2000 | Gretta et al. | 700/83 |
| 6,275,741 B1 * | 8/2001 | Choi | 700/200 |
| 6,298,377 B1 * | 10/2001 | Hartikainen et al. | 709/223 |
| 6,370,448 B1 * | 4/2002 | Eryurek | 700/282 |
| 6,380,949 B2 * | 4/2002 | Thomas et al. | 345/705 |

OTHER PUBLICATIONS

Fisher, "FIELDVUE Istruments: Opening A Window To The Process," *Fisher Controls International, Inc.*, pp. 1–8 (1994).

Fisher, "FIELDVUE Digital Valve Controller DVC5000 Series," *Fisher Controls International, Inc.*, Bulletin 62.1:DVC5000, pp. 1–12 (Jun. 1994).

Fisher, "FIELDVUE Digital Valve Controller DVC5000 Series Remotely Accessible Information," *Fisher Controls International, Inc.*, Bulletin 62.1:DVC5000(S1), pp. 1–2 (Jun. 1994).

Fisher, "FIELDVUE Digital Transducer DT4000 Remotely Accessible Information," *Fisher Controls International, Inc.*, Bulletin 62.1:DT4000(S1), pp. 1–2 (Jun. 1994).

Fisher, "Type VL1000 FIELDVUE Valve Link," *Fisher Controls International, Inc.*, Bulletin 62.1:VL1000, pp. 1–2 (Jun. 1994).

Fisher, "FIELDVUE Digital Transducer Type DT4000," *Fisher Controls International, Inc.*, Bulletin 62.1:DT4000, pp. 1–12 (Jun. 1994).

Fisher, "Type HF100 FIELDVUE HART Filter," *Fisher Controls International*, Form 5340, pp. 1–6 (Dec. 1993).

Fisher, "HART Communicator Manual for FIELDVUE Instrumetnts," *Fisher–Rosemount*, Form 5345, pp. 1–40 (Apr. 1995).

Fisher, "FIELDVUE Digital Valve Controller Type DVC5000 Series," *Fisher–Rosemount*, Form 5335, pp. 1–38 (Jun. 1995).

Fisher, "FIELDVUE Digital Transducer Type DT4000," *Fisher–Rosemount*, Form 5334, pp. 1–24 (Jun. 1995).

Fisher, "FIELDVUE ValveLink Series VL2000 Software," Bulletin 62.1:VL2000, *Fisher Controls International, Inc.*, pp. 1–6 (Nov., 1995).

Fisher–Rosemount Systems, "DeltaV—Fieldbus Device Database," Product Data Sheet, 10 pages (Mar. 1998).

Fisher–Rosemount Systems, "DeltaV System Overview, Do More," pp. 1–30 (1998).

ISP, "InterOperable SystemS Project (ISP) Device Description Services (DDS) User's Guide," ISP–94–110, Rev. 1.0, 54 pages (Jun. 1994).

ISP, "InterOperable Systems Project Fieldbus Specification Device Description Language," *ISP Foundation*, pp. 1–101 (Dec. 1993).

Leeney, "Instrument Remotely Verified Valve's Stem Position," *Chemical Processing*, Form 8238, pp. 1–2 (Dec. 1993).

* cited by examiner

USER INTERFACE THAT INTEGRATES A PROCESS CONTROL CONFIGURATION SYSTEM AND A FIELD DEVICE MANAGEMENT SYSTEM

FIELD OF THE INVENTION

The present invention relates generally to process control networks and, more specifically, to a user interface that integrates a process control configuration system with a field device management system.

DESCRIPTION OF THE RELATED ART

Before the advent of computer systems, manufacturers had difficulty accurately controlling, operating, and maintaining chemical, petroleum or other processes of even a moderate level of complexity. For example, in order to open a valve, the valve would have to be manually adjusted, which often meant sending an employee to a distant field location. The advent of computer systems allowed the development of controllers to monitor and manipulate large numbers of field devices such a valves and sensors in predetermined manners through a communication network connected to the field devices in a process control network. Furthermore, before computer systems were applied to field device management tasks, tracking, testing and maintaining the elements in a process network was a challenging task. For example, to verify that a valve was working properly, an inspection of the valve would be required, which often meant traveling to distant field locations. The introduction of computer systems allowed users to track and maintain field devices without having to travel to the field location to inspect and test the field devices.

Modern process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. More recently, however, the process control industry has developed a number of standard, open, digital or combined digital and analog communication protocols such as the FOUNDATION™ FIELDBUS (hereinafter "Fieldbus"), HART, PROFIBUS, WORLDFIP, Device-Net and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via signal lines or buses to the field devices to thereby control the operation of the process. In some cases, the controller may coordinate control activities performed by the field devices.

Workstations, which are typically connected to the controllers through communication connections such as a direct or wireless bus, Ethernet, modem, phone line, and the like, have processors and memories which are adapted to run software or firmware such as process control configuration systems and field device management systems. Process control configuration systems are typically used to configure a process control network and to enable control of a process during runtime. These configuration/control tasks include, for example, setting-up and designing a system, viewing a connection arrangement in the system, designing and creating control configurations or process control solutions, changing control configurations and connecting field devices to a system, documenting system hardware and software, etc. Process control configuration systems often perform these tasks using a configuration database that stores information about the manner in which devices are connected within the process and how those devices are controlled to implement the process. In some cases, the process configuration system uses a graphical interface to enable a user to view the location of field devices within the system, to view the code (such as function blocks) being used in the system, to view what a process control solution (which may used to control all or part of a process) looks like, etc. An example of a process control configuration system is Delta V™ system sold by Fisher-Rosemount Systems, Inc.

Field device management systems typically perform functions related to communicating with individual devices to change the configuration or settings of a device, to obtain information stored within the device or within a field device database associated with the device, etc. This information may be, for example, status information, (e.g., whether an alarm or other similar event has occurred), device configuration information (e.g., the manner in which the device is currently or may be configured, the type of measuring units used by the field device), device parameters (e.g., the field device range values and other parameters), etc. In addition, field device management systems may enable field devices to be commissioned by, for example, changing the field device range values or other like parameters of the field device. An example of a field device management system is the AMS™ system sold by Fisher-Rosemount, Inc.

However, the process control configuration system and field device management system used by current process control networks are different programs, which means that a user must view process set-up and other information using a process control configuration system running on a workstation and must switch to a separate workstation or to a separate program to view field device specific information provided by a the field device management system. This separation of systems is inconvenient to users, may require duplicate hardware and necessitates that users be trained in multiple systems.

SUMMARY OF THE INVENTION

A user interface for use in a process control network that operates according to a process control solution includes a controller that implements at least a portion of the process control solution, a plurality of field devices communicatively coupled to the controller and a workstation communicatively coupled to the controller, the workstation including a processor, a memory and a display. A process control configuration system is stored in the memory and is adapted to be run on the processor to manipulate process control configuration information stored in a process control configuration database. Likewise, a field device management system is stored in the memory and is adapted to be run on the processor to implement communication with respect to field device management information stored in one of the field devices or in a field device management database associated with one of the field devices. An interface adapted to be run on the processor passes data between the process control configuration system and the field device management system to enable simultaneous use of the process control configuration system and the field device management system while a display routine displays both process control configuration information and field device management information via the display. The display routine may produce a plurality of icons on the display, wherein each icon represents a different field device associated with the process control configuration information, and a routine may call the field device management system upon selection of one of the icons by a user to thereby obtain field device management information related to the selected field device.

According to another aspect of the invention, a user interface system is adapted to be used in a process control network having a controller communicatively coupled to a plurality of field devices, a process control configuration database and a workstation having a display and a processor communicatively coupled to the controller. The user interface system includes a memory, a process control configuration system stored in the memory which accesses process control configuration information stored in the process control configuration database, a field device management system stored in the memory which accesses field device management information from one of the field devices and an interface that passes data between the process control configuration system and the field device management system to enable simultaneous use of the process control configuration system and the field device management system.

According to still further aspect of the invention, a method of creating a user interface includes the steps of operating a process control configuration system that displays images representing process control configuration information on a display, determining when an image on the display is selected, searching a memory for identification data related to the selected image and communicating the identification data from the process control configuration system to a field device management system through an interface. The method then searches for field device management information related to the identification data and displays the field device management information on the display with the process control configuration information.

DESCRIPTION OF THE PREFERRED EMBODIMENTS

Figure 1:
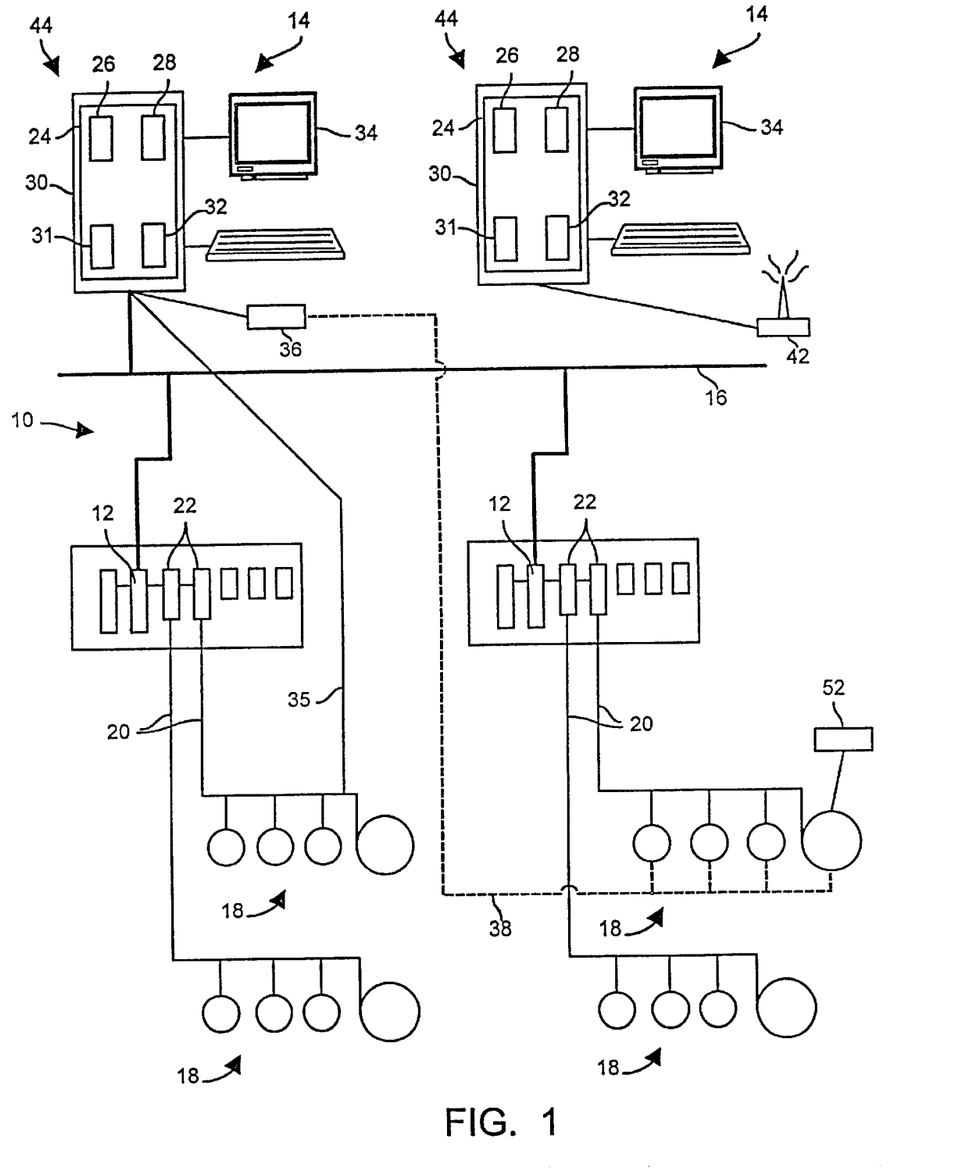
FIG. 1 is block diagram of a process control network.

Referring now to FIG. 1, a process control network 10 includes one or more process controllers 12, coupled to numerous workstations 14 via a data highway 16, which may be, for example, an Ethernet connection. Each of the controllers 12 is also coupled to field devices or equipment (generally designated by the reference numeral 18) within a process via communication lines 20. The controller 12, which may be by way of example only, the Delta V™ controller sold by Fisher-Rosemount Systems, Inc., is capable of communicating with the field devices 18 via one or more input/output cards 22 which may be attached to or separated from the controller 12. The controller 12 performs one or more process control configuration routines or process control solutions to thereby implement desired control of the process.

One or more of the workstations 14 (any of which may be, for example, a personal computer) includes a memory 24 for storing a process control configuration system (or routine) 26 and a field device management system (or routine) 28 and includes a processor 30 that executes the process control configuration system 26 and the field device management system 28. The process control configuration system 26 may be used by one or more operators, engineers or other users, for example, to document the types and locations of devices connected within the process, to review or change the documented configuration of the process control network 10, to document information pertaining to individual control elements such as the controller 12, the I/O cards 22, the field devices 18 and function blocks within the process control network 10, to design one or more process control routines or process control solutions to be executed by the controller 12 (or the field devices) during runtime of the process, to communicate with the controller 12 so as to download the process control routines or other configuration information, to receive and display information pertaining to the process during operation of the process, etc.

The field device management system may communicate directly with the field devices 18 to obtain field device information therefrom and may store this information in a database for future reference. Each of the workstations 14 also includes a process control configuration database 31 that stores the process control configuration information used by the process control configuration system 26 and may include a field device management database 32 that stores information pertaining to or obtained from the field devices 18 by the field device management system 28. These databases may be stored in memory 24 or in any other desired memory. Of course, each of the workstations 14 includes a display 34 that may be used by the process control configuration system 26 and/or the field device management system 28 to display information to a user.

Likewise, the controller 12 includes a memory that stores process control configuration information and process control solutions to be used to control the process and a processor that executes the process control solutions. The controller 12 communicates with the field devices 18 via any desired or standard I/O cards 22. By way of example only, the I/O cards 22 may be analog I/O cards that connect the controller 12 to the field devices 18 using 4 to 20 mA buses, may be digital or combined digital and analog I/O cards that communicate with digital or mixed digital and analog field devices 18 using any desired format or protocol such as HART, PROFIBUS, WORLDFIP, DeviceNet and CAN. Still further, the I/O cards 22, the communication lines 20 and the field devices 18 may be Fieldbus components that communicate and interoperate using the Fieldbus protocol. Generally speaking, the Fieldbus protocol is an all-digital, serial, two-way communication protocol that provides a standardized physical interface to a two-wire loop or bus that interconnects the field devices. If the controller 12 is a Delta V™ controller, it, or the process control configuration system 26 may provide a graphical depiction or icon of the process control solutions within the controller 12 to a user via one of the workstations 14 illustrating the control elements within the process control solutions and the manner in which these control elements are interconnected to provide control of the process. Likewise, the process control configuration system 26 may present process control configuration information stored in the process control configuration database 31 to the user via one of the displays 34. This information may be depicted using icons, which may be textual, graphical, etc. in nature.

If desired, the field devices 18 can be in communication with one or more of the workstations 14 via a direct line 35 from one of the buses 20 connected to the field devices 18. In the alternative, a modem 36 and telephone service 38 can be used to allow one or more of the workstations 14 to communicate directly with one or more of the field devices 18. Further, wireless communication equipment 42 and associated equipment can be used to link the workstations 14 and one or more of the field devices 18 to provide direct communication between the workstations 14 and the field devices 18. These direct communication networks may be used by, for example, the field device management system 28 to communicate with the field devices 18 to obtain information pertaining to the field devices 18.

In the system of FIG. 1, the process control configuration system 26 operates on one of the workstations 14 connected to the process control network 10. The process control configuration system 26 may include a browser that displays information pertaining to the configuration or make-up of the process control network 10 or any of the individual areas, field devices 18, function blocks, etc. therein. The browser may be similar to or the same as, for example, the Microsoft™ Internet Explorer™ provided in a Microsoft™ Windows95™, Windows98™ or WindowsNT™ environment. U.S. Pat. No. 5,838,563 to Dove et al. describes and illustrates a process control configuration system 26 which may be used, and this patent is hereby expressly incorporated by reference herein.

In general, process control configuration systems 26, such as the Delta V™ system, allow a user to set up, change and view process control configurations and process control solutions in a graphical format. Accordingly, individual elements in the process control network 10 can be viewed and manipulated in the graphical fashion, such as by moving icons on the display 34. For example, referring to FIG. 1, an icon related to a valve or any other desired ones of the field device 18 within the process control network 10 may be selected and its documented placement within the network may be adjusted simply by moving the icon on the display 34 with a mouse. Likewise, its documented configuration may be changed by selecting the icon and entering new information for that device. It is important to note, however, that the process control configuration system 26 does not actually configure the field device 18, this task being accomplished by the field device management system 28. Instead, the process control configuration system 26 merely documents the location, and other information associated with the device as input by a user. Of course, the configuration parameters that may be adjusted vary by the field device 18, but the process control configuration system 26 recognizes what parameters are adjustable and displays these parameters to the user.

Figure 2:
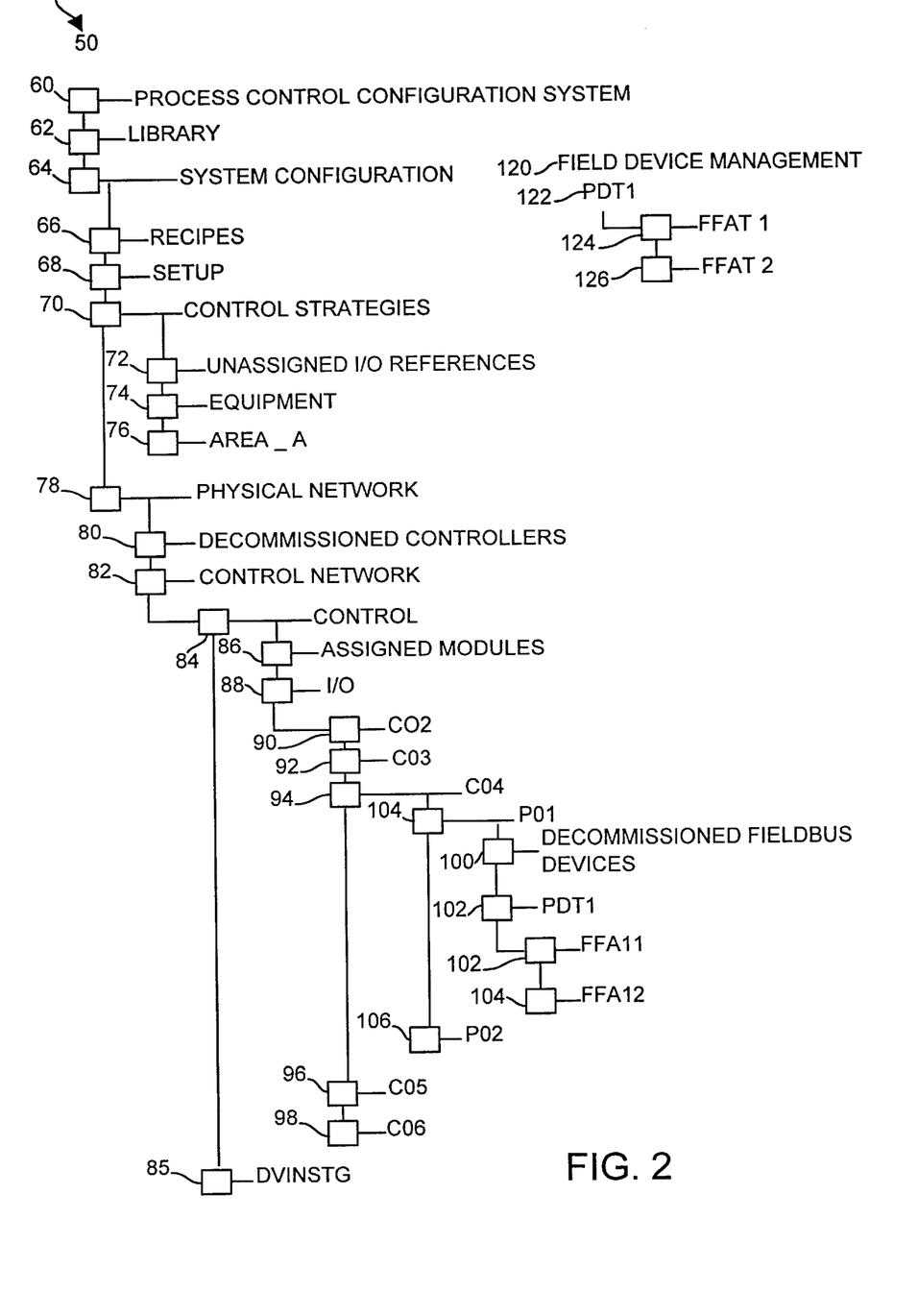
FIG. 2 is a display screen produced by an integrated user interface.

FIG. 2 illustrates a sample display 50 generated by a process control configuration system 26 (such as the Delta V™ Explorer) on the display 34. The sample display 50 of FIG. 2 generally specifies the hardware and software elements associated with the process control network 10 and the inter-relationships between these elements, as the process control network 10 is configured.

Thus, with respect to FIG. 2, an icon 60 represents the process control configuration system itself, while an icon 62 represents a library associated with the process control configuration system. This library may store software components or other information to be used to add new devices, etc., to the configuration. An icon 64 represents the current system configuration. Selecting the system configuration icon 64 allows the user to view icons related to the system as currently configured. The configuration may include, for example, recipes 66, setup information 68, control strategies 70 and a physical network 78. Generally speaking, the recipes icon 66 denotes information used by process control solutions to control a process. The setup icon 68 enables a user to change system-wide configuration parameters. The control strategies icon 70 allows a user to examine what control strategies exist for different equipment and areas of the process as well as what resources the user has to create a new process control solution, such as what input/output references are unassigned 72, what equipment 74 is attached to the network and what areas 76 are associated with the process control network.

The physical network icon 78 is related to the physical resources available to execute a process control solution such as which decommissioned controllers 80 exist within the system and what control networks 82 currently exist. Each control network 82 is a subset of the physical network 78. A control network 82 consists of at least one controller 84 and a workstation 85. Control modules 86 and input/output (I/O) networks 88 are illustrated as being associated with the controller 84, the modules 86 being within the controller itself or devices communicatively attached to the controller. Generally speaking, the modules 86 are code blocks which may be related to a specific physical field devices or control algorithms. Modules 86 also can be thought of as objects in an object oriented computer code language. The I/O network 88 includes I/O cards such as (CO2) (90), (CO3) (92), (CO4) (94), (CO5) (96), and (CO6) (98). The Decommissioned Fieldbus Devices icon 100 holds a list of off-line fieldbus devices connected through a first port PO1 (104). As illustrated in FIG. 2, PDT1 102 (a field device) is communicatively connected to the I/O device CO4 (94) through the port (PO1) 104. The ports PO1 (104) and PO2 (106) act as gateways to field devices. Function blocks 108 and 110 are illustrated as associated with the device PDT1 (102) and may be capable of, for example, executing process control functions. Of course, the information necessary for generating the display of FIG. 2, as well as other information associated with each of the devices therein is stored in the process control configuration database 31 of FIG. 1.

Generally, field device management is performed by a separate software system than the process control configuration system. As noted above, the field device management system 28 allows the user to configure, calibrate, monitor and troubleshoot any of the field devices 18 connected to a network, for example, through Ethernet or any other bus or communication network. Referring again to FIG. 1, the field device management system 28 operates on the workstation 14, and is illustrated as being connected to an operating system and CPU (i.e., a processor) 30. The memory 24 having the field device management system information (separate from the process control configuration system information) is also coupled to the operating system and processor 30. The memory 24 stores the information used by the field device management system 28 to perform tasks related to displaying information to a user via the display 34 or other output device and communicating with the field devices 18. In addition, the field device management database 32 stores field device-related information which has already been retrieved from or which is not otherwise available from the field devices 18, for example, information pertaining to past configurations of the field devices 18, information pertaining to conventional field devices and other off-line field devices such as off-line smart field devices and information pertaining to service needs including when the next service is needed, who performed service procedures, any favored replacement field devices, etc. Information pertaining to off-line smart field devices may be stored within the field device management database 32 in a format identical to the format in which that information is actually stored within off-line smart field devices so that, to the field device management system 28, off-line field devices appear to be available through the field device management database 32 in essentially the same way that they would be available if those field devices were on-line. Likewise information pertaining to conventional field devices may be stored within the field device management database 32 in a format identical to the format in which that information would be stored in a comparable smart field device so that, to the field device management system 28, conventional field devices appear to be off-line smart field devices. Wellan et al., U.S. Pat. No. 5,796,602 and Sharpe, Jr. et al., U.S. Pat. No. 5,903,455 describe an exemplary field device management system, the disclosure of each which is hereby expressly incorporated by reference herein.

Referring again to FIG. 1, the field device management system 28 may, for example, permit a user to select a field device 18 which is in communication with the field device management system 28. The field device management system 28 then communicates with the field device 18 through the data highway 16 or through wireless communication network 42, or any other desired or provided communication link. The field device management system 28 may inquire whether the field device 18 has any alarms to report, ascertain the status of the device, change or read the configuration of the device, or obtain other information provided by or stored within the device. In some cases, the field device management system 28 may store retrieved information in a field device management database 32, and may also obtain information from the field device management database 32 pertaining to one or more of the field devices 18.

There are difficulties in having a separate a process control configuration system 26 and field device management systems 28. First, a user needs to be trained to use both of these systems, which takes unnecessary time and expense and can be confusing to users. Second, in order to use both systems, a user has to switch between the systems. In some cases, the systems may be operating on different workstations which are geographically separated, making switching between the systems especially inconvenient. In the situations where both systems are operating on the same workstation 14, a user is still required to switch between systems to examine different aspects of the same field device 18, i.e., the manner in which the field device is placed within the process control network 10 (as provided by the process control configuration system 26) and information stored in or pertaining to the particular device (as provided by the field device management system 28).

According to the present invention, a user interface integrates the use of the process control configuration system 26 with the field device management system 28, allowing a user to create and control a process and maintain the system from one location using one software system. Such a user interface might enable a user to calibrate a field device, reset a field device or check the status of a field device tasks, which traditional process control configuration systems 26 are not able or designed to perform, without exiting the process control configuration system 26. A sample graphical display of a process control configuration system 26 integrated with a field device management system 28 on a user interface 44 is illustrated in FIG. 2. While the illustrated user interface uses the Delta V™ graphical interface, any other process control configuration system interface or display routine may be used instead, including that associated with a field device management system 28 or a stand alone graphical routine.

Using the integrated system, as illustrated in FIG. 2, the field device PDT1 102 could be selected by highlighting it with a computer mouse. Upon selection of the device PDT1 102, the process control configuration system 26 consults the process control configuration database 31 to obtain identification data, such as the field device manufacturer, the device type, the device identification number, the device serial number, etc. associated with the selected device. This identification data is then passed to the field device management system 28 using an interface. The field device management system 28 refers to the field device management database 32 to locate information pertaining to the selected device as identified by the identification data. If necessary, the field device management system 28 may communicate with the selected device to obtain information pertaining to that device and may communicate with the field device management database 32 to obtain field device management information pertaining to the selected device. Of course, the field device management system 28 uses the identification data received from the process control configuration system 26 to locate the information pertaining to the selected device. Once the field device management system 28 locates the desired field device management information, the field device management system 28 communicates this information back to the process control configuration system 26 through the interface. At this point, the graphical display routine (which may be associated with the process control configuration system 26, the field device management system 28 or may be a separate routine) places information related to the selected field device 18 on a split screen. Such displayed information may take the form of icons 120, 122, 124, 126 which may be selected to indicate further information about the device as stored in the device or the field device management database 32 associated with the device. For example, if PDT1 102 is a valve, then process control configuration system options would be shown on one side of the display 34 and field device management system 28 options, such as the current flow through the valve and whether the valve has registered any alarms, would be shown on the other side of the display 34. This combined user interface 44 is advantageous in that a user can view, virtually immediately, field device management information and process control configuration information from the same workstation 14.

Figure 3:
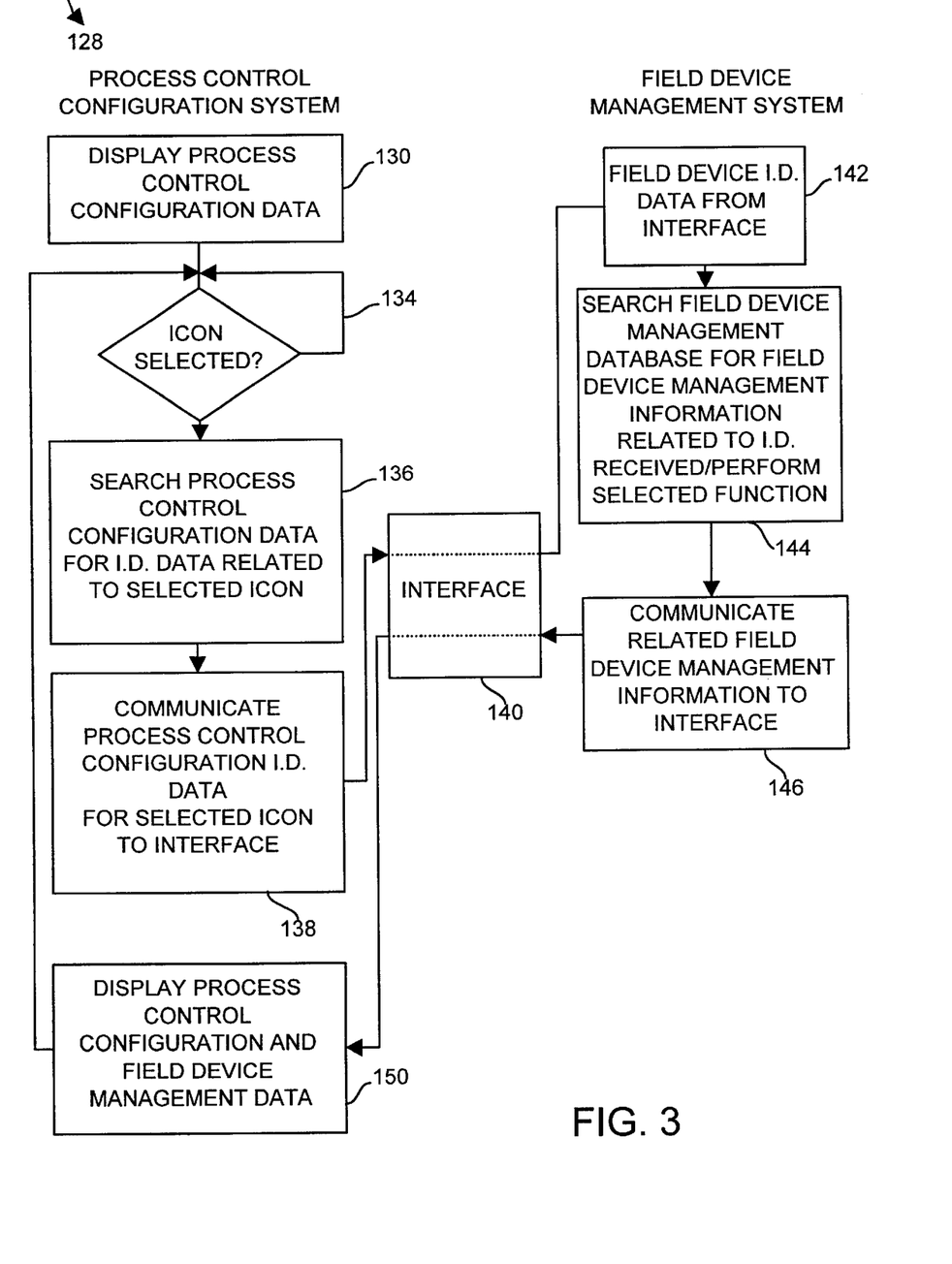
FIG. 3 is a flow diagram of a method for integrating a process control configuration system with a field device management system on a user interface.

A flowchart 128 associated with a user interface system that integrates a process control configuration system 26 with a field device management system 28 is illustrated in FIG. 3. Initially, the process control configuration system 26 and the field device management system 28 are stored in the same computer system which may be, for example, one of the workstations 14. The user interface system runs the process control configuration system 26 which has a block 130 that displays one or more of the elements of the process control network 10. The user interface system or the process control configuration system 26 executes a block 134 that determines whether an icon presented by the process control configuration system 26 has been selected. If an icon is not selected using a keyboard, a mouse, a light pen or other input device, the block or routine 134 loops or waits for a device to be selected or enables other actions associated with the process control configuration system 26 to be performed. However, if a device icon is selected, a block 136 searches the memory 24 for identification data related to the selected field device 18 (which may be any of the devices associated with the process control network 10 including controllers, I/O devices, smart field devices, conventional field devices, etc.). This identification data may be a device manufacturer, device type, device revision, device identification number or serial number or any other desired data identifying a device. A block 138 then communicates the located identification data for the selected icon to an interface 140, which may be, for example, a DCOM (distributed component object module) interface.

Generally speaking, DCOM is a software architecture that allows systems to be built from binary software components. DCOM is the underlying architecture that forms the foundation for higher-level software services, like those provided by an Object Linking and Embedding ("OLE") service. OLE services span various aspects of commonly needed system functionality, including compound documents, customer controls, inter-application scripting, data transfer, and other software interactions. DCOM and OLE are familiar to those skilled in the art and will not be discussed in depth here. However, any other desired hardware or software interface 46 may be used as well.

The interface 140 communicates the identification data received from the process control configuration system 26 to the field device management system 28 where the identification data is received by a block 142. A block 144 within the field device management system 28 then accesses information related to the device specified by the identification data. This information may be stored in and retrieved from the field device 18 or other device, or may be stored in and retrieved from the field device management database 32. Alternately or in addition, the block 144 may perform some function associated with the field device management system 28 such as reconfiguring the field device, etc. Such function information can be passed to the field device management system via the interface 140.

A block 146 associated with the field device management system 28 then communicates the field device management information ascertained by the field device management system 28 to the interface 140, which delivers this information to a display block 150 in the process control configuration system 26. The display block 150, which can alternatively be a separate display routine or part of the field device management system 28 updates the display 34 by adding the field device management information associated with the selected device to the display 34. In this manner, the user can view and access the manufacturer of the selected field device, the type or version of the field device, as well as other information about the field device. The user can also view and access the specific information related to the current state of a field device such as the status, calibration, etc. The field device configuration system 28 then can be used to reconfigure the specific field device 18 or to reconcile the resources among the field devices 18, along with any other desired functions using the interface.

The user interface described herein is preferably implemented in software stored in, for example, a workstation or other device. However, this interface may alternatively or additionally be implemented in hardware, firmware, application specific integrated circuits, programmable logic circuits, etc., as desired. If implemented in software, the user interface may be stored in any computer readable memory such as on a magnetic disk, a laser disk, or other storage medium, in a RAM or ROM of a workstation, computer, controller, field device, etc. Likewise, this software may be delivered to a user or a device via any known or desired delivery method including, for example, over a communication channel such as a telephone line, the Internet, on a transportable medium, such as a computer-readable disk, etc.

While the invention has been described with reference to various embodiments, it will be understood that these embodiments are illustrative only and that the scope of the invention is not limited to these embodiments. Many variations, modifications, additions and improvements of the described embodiments are possible.

We claim:

1. A user interface for use in a process control network that operates according to a process control configuration solution, comprising:

a controller that implements at least a portion of the process control configuration solution;

a plurality of field devices communicatively coupled to the controller;

a workstation communicatively coupled to the controller, the workstation including a processor, a memory and a display;

a process control configuration system stored in the memory and adapted to be executed on the processor that manipulates process control configuration information stored in a process control configuration database pertaining to a configuration of the process control network and that configures process control solutions;

a field device management system stored in the memory and adapted to be executed on the processor to configure the field devices, calibrate the field devices, monitor the field devices, troubleshoot the field devices, generate alarms about the field devices, track alarms in the field devices and test the field devices and to implement two-way communication with respect to field device management information stored in at least one of the field devices or in a field device management database associated with at least one of the field devices;

an interface adapted to be executed on the processor that passes data between the process control configuration system and the field device management system to enable simultaneous use of the process control configuration system and the field device management system; and a display routine that displays the process control configuration information and the field device management information via the display.

2. The user interface of claim 1, wherein the display routine simultaneously displays the process control configuration information and the field device management information via the display.

3. The user interface of claim 1, wherein the workstation is a personal computer.

4. The user interface of claim 1, wherein the display routine produces a plurality of icons on the display, wherein one of the icons represents one of the field devices, further including a calling routine that calls the field device management system upon selection of the one of the icons by a user.

5. The user interface of claim 1, wherein the interface is a distributed component object module.

6. The user interface of claim 1, wherein the data is field device identification data.

7. The user interface of claim 6, wherein the field device identification data represents a field device serial number.

8. The user interface of claim 1, wherein the process control configuration information is stored in the memory and the field device management information is stored in the memory.

9. A user interface system adapted to be used in a process control network having a controller communicatively coupled to a plurality of field devices, a process control configuration database that stores process control configuration information pertaining to the process control network and a workstation having a display, a processor and a memory communicatively coupled to the controller, the user interface system comprising:

a process control configuration system stored in the memory and adapted to be executed on the processor to access the process control configuration database network and that configures process control solutions;

a field device management system stored in the memory and adapted to be executed on the processor to enable a user to configure the field devices, calibrate the field devices, monitor the field devices, troubleshoot the field devices, generate alarms about the field devices, track alarms in the field devices and test the field devices and to communicate via two-way communication field device management information stored in at least one of the field devices or in a field device management database associated with at least one of the field devices pertaining to at least one of the field devices; and an interface adapted to be executed on the processor that passes data between the process control configuration system and the field device management system to enable simultaneous use of the process control configuration system and the field device management system.

10. The user interface system of claim 9, wherein the field device management system displays the field device management information and the process control configuration system displays process control configuration information simultaneously on the display of the workstation.

11. The user interface system of claim 9, wherein the process control configuration system displays process control configuration information and field device management information simultaneously on the display of the workstation.

12. The user interface system of claim 9, wherein the field device management system displays process control configuration information and field device management information simultaneously on the display of the workstation.

13. The user interface system of claim 9, wherein the process control configuration system produces a plurality of icons on the display, wherein one of the icons represents a field device stored in the process control configuration database and wherein the user interface system further includes a subroutine that calls the field device management system upon selection of one of the icons by a user.

14. The user interface system of claim 9, wherein the user interface is a distributed component object module.

15. The user interface system of claim 9, wherein the data is field device identification data.

16. The user interface system of claim 9, wherein the data represents a field device serial number.

17. A method of creating a user interface comprising the steps of:

operating a process control configuration system to access process control configuration information from a process control configuration database network and that configures process control solutions;

displaying images representing the process control configuration information on a display;

recognizing when an image on the display related to a field device is selected;

searching a memory for identification data related to the selected image;

communicating the identification data from the process control configuration system to a field device management system through an interface wherein the field device management system configures the field devices, calibrates the field devices, monitors the field devices, troubleshoots the field devices, generates alarms about the field devices, tracks alarms in the field devices and tests the field devices;

searching via two-way communication for field device management information related to the identification data stored in at least one of the field devices or in a field device management database associated with at least one of the field devices;

displaying the field device management information on the display with the process control configuration information; and allowing the field devices to be configured.

18. The method of creating a user interface of claim 17, wherein the step of communicating includes the step of using a distributed component object model as the interface.

19. The method of creating a user interface of claim 17, further comprising the step of running the process control configuration system and the field device management system on a single processor.

20. The method of creating a user interface of claim 17, further comprising the step of the storing process control configuration information, the identification data and the field device management information in a single memory.

* * * * *

UNITED STATES PATENT AND TRADEMARK OFFICE
CERTIFICATE OF CORRECTION

PATENT NO.     : 6,618,630 B1
DATED          : September 9, 2003
INVENTOR(S)    : Larry O. Jundt et al.

It is certified that error appears in the above-identified patent and that said Letters Patent is hereby corrected as shown below:

<u>Title page, Item [54] and Column 1, line 1,</u>
Title, delete "USER INTERFACE" and insert -- A USER INTERFACE --.

<u>Title page,</u>
Item [56], OTHER PUBLICATIONS, delete "SystemS" and insert -- Systems --.

<u>Column 1,</u>
Line 22, delete "such a values" and insert -- such as values --.

<u>Column 2,</u>
Line 47, delete "a the field device" and insert -- the field device --.

<u>Column 10,</u>
Line 62, delete "of the one of the icons" and insert -- of one of the icons --.

<u>Column 12,</u>
Line 44, delete "comprising the step of the storing process control" and insert
-- comprising the step of storing the process control --.

Signed and Sealed this

Tenth Day of February, 2004

JON W. DUDAS
*Acting Director of the United States Patent and Trademark Office*